United States Patent
Nijemcevic et al.

(10) Patent No.: US 8,189,961 B2
(45) Date of Patent: May 29, 2012

(54) TECHNIQUES IN OPTICAL CHARACTER RECOGNITION

(75) Inventors: Djordje Nijemcevic, Beograd (RS); Sasa Galic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 71 days.

(21) Appl. No.: 12/797,219

(22) Filed: Jun. 9, 2010

(65) Prior Publication Data

US 2011/0305393 A1 Dec. 15, 2011

(51) Int. Cl.
*G06K 9/00* (2006.01)

(52) U.S. Cl. ........ 382/292; 382/100; 382/182; 382/198; 382/289

(58) Field of Classification Search .................. 382/100, 382/182, 198, 199, 266, 289, 292
See application file for complete search history.

(56) References Cited

U.S. PATENT DOCUMENTS

| | | | |
|---|---|---|---|
| 5,563,403 A | 10/1996 | Bessho et al. | |
| 5,818,976 A | 10/1998 | Pasco et al. | |
| 5,822,454 A | 10/1998 | Rangarajan | |
| 6,298,157 B1 * | 10/2001 | Wilensky | 382/199 |
| 7,027,666 B2 | 4/2006 | Rudak et al. | |
| 7,627,178 B2 * | 12/2009 | Suzuki et al. | 382/190 |
| 7,970,239 B2 * | 6/2011 | Quan et al. | 382/289 |
| 2005/0123179 A1 * | 6/2005 | Chen et al. | 382/128 |
| 2009/0052802 A1 * | 2/2009 | Curtis | 382/289 |

OTHER PUBLICATIONS

"Automatic and Manual Deskew", Retrieved at <<http://www.techsoftusa.com/deskew.htm>>, Retrieved Date: Dec. 24, 2009, p. 1.
"OCR Xpress Standard—Summary", Retrieved at <<http://www.componentsource.com/products/ocr-xpress-standard/summary.html>>, Retrieved Date: Dec. 24, 2009, pp. 2.
Hull, Jonathan J., "Document Image Skew Detection: Survey and Annotated Bibliography", Retrieved at <<http://rii.ricoh.com/~hull/pubs/hull_skew_survey.pdf>>, Document Analysis Systems II. Word Scientific, 1998, pp. 40-64.
Le, et al., "Automated Page Orientation and Skew Angle Detection for Binary Document Images", Retrieved at <<http://archive.nlm.nih.gov/pubs/doc_class/prword.php>>, Pattern Recognition, vol. 27, No. 10, Oct. 1994, pp. 7.
Kapogiannopoulos, et al., "A Fast High Precision Algorithm for the Estimation of Skew Angle Using Moments", Retrieved at <<http://cgi.di.uoa.gr/~gkapog/A%20Fast%20High%20Precision%20Algorithm%20for%20the%20Estimation%20of%20Skew%20Angle%20Using%20Moments.pdf>>, IASTED International Conference Signal Processing, Pattern Recognition and Applications (SPPRA), Jun. 25-28, 2002, pp. 5.

* cited by examiner

*Primary Examiner* — Stephen R Koziol
(74) *Attorney, Agent, or Firm* — Mayer & Williams P.C.

(57) ABSTRACT

An image deskew system and techniques are used in the context of optical character recognition. An image is obtained of an original set of characters in an original linear (horizontal) orientation. An acquired set of characters, which is skewed relative to the original linear orientation by a rotation angle, is represented by pixels of the image. The rotation angle is estimated, and a confidence value may be associated with the estimation, to determine whether to deskew the image. In connection with rotation angle estimation, an edge detection filter is applied to the acquired set of characters to produce an edge map, which is input to a linear hough transform filter to produce a set of output lines in parametric form. The output lines are assigned scores, and based on the scores, at least one output line is determined to be a dominant line with a slope approximating the rotation angle.

20 Claims, 8 Drawing Sheets

TECHNIQUES IN OPTICAL CHARACTER RECOGNITION

BACKGROUND

Optical character recognition techniques are useful to decode images of characters, such as horizontal lines of text, obtained using various types of image capture devices, including but not limited to scanners and digital cameras.

Often, variations in orientation of image capture devices or in surfaces upon which characters are displayed (for example, paper) result in images having characters that are deformed with respect to the original characters. For example, images of lines of text are commonly skewed or rotated relative to the original lines of text on a page. It can be difficult to reliably decode skewed or rotated lines of text within images.

SUMMARY

An image deskew system ("IDS") and techniques, aspects of which may be implemented in a network-based or a client-based operating environment, are used in the context of optical character recognition to estimate, within an image of an original set of characters having an original linear orientation, the rotation angle (relative to the original linear orientation) of a corresponding acquired set of characters having an acquired linear orientation in the image.

In accordance with one technique, the rotation angle is estimated by applying an edge detection filter to the acquired set of characters (or one or more regions or sub-regions thereof) to produce an edge map. The edge map includes "edge pixels," which are pixels of the image that lie along one or more lines associated with the acquired set of characters, such as mean lines or base lines. The edge map is input to a linear hough transform filter to produce a set of output lines in (r, Θ) parametric form. An output line is represented by an element of a matrix, with each pixel contributing one "vote" to a particular output line. A score (for example, based on the number of votes) is assigned to each output line. Based on the scores, one or more dominant output lines and the slope(s) thereof, which correspond to the parameter(s) Θ of the output line(s), and thus the estimated rotation angle(s), is/are identified.

In accordance with another technique, a confidence value, representing a likelihood that the estimated rotation angle(s) closely approximates the actual rotation angle, may also be calculated. Generally, the confidence accorded to the estimated rotation angle depends on the number and distribution of dominant text lines having similar slopes that are detected within one or more regions or sub-regions of the acquired set of characters. Among other things, the confidence value can be used to determine whether or not to deskew the image prior to proceeding with further optical character recognition processing activity.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this document.

DETAILED DESCRIPTION

The image deskew system ("IDS") and techniques described herein operate in client- and/or network-based devices to estimate, with a certain confidence, a rotation angle of an acquired set of characters within an image. The acquired set of characters corresponds to an original set of characters displayed on a surface in an original linear orientation. The techniques discussed herein are useful to enhance the accurate and efficient decoding of images of characters.

Figure 1:
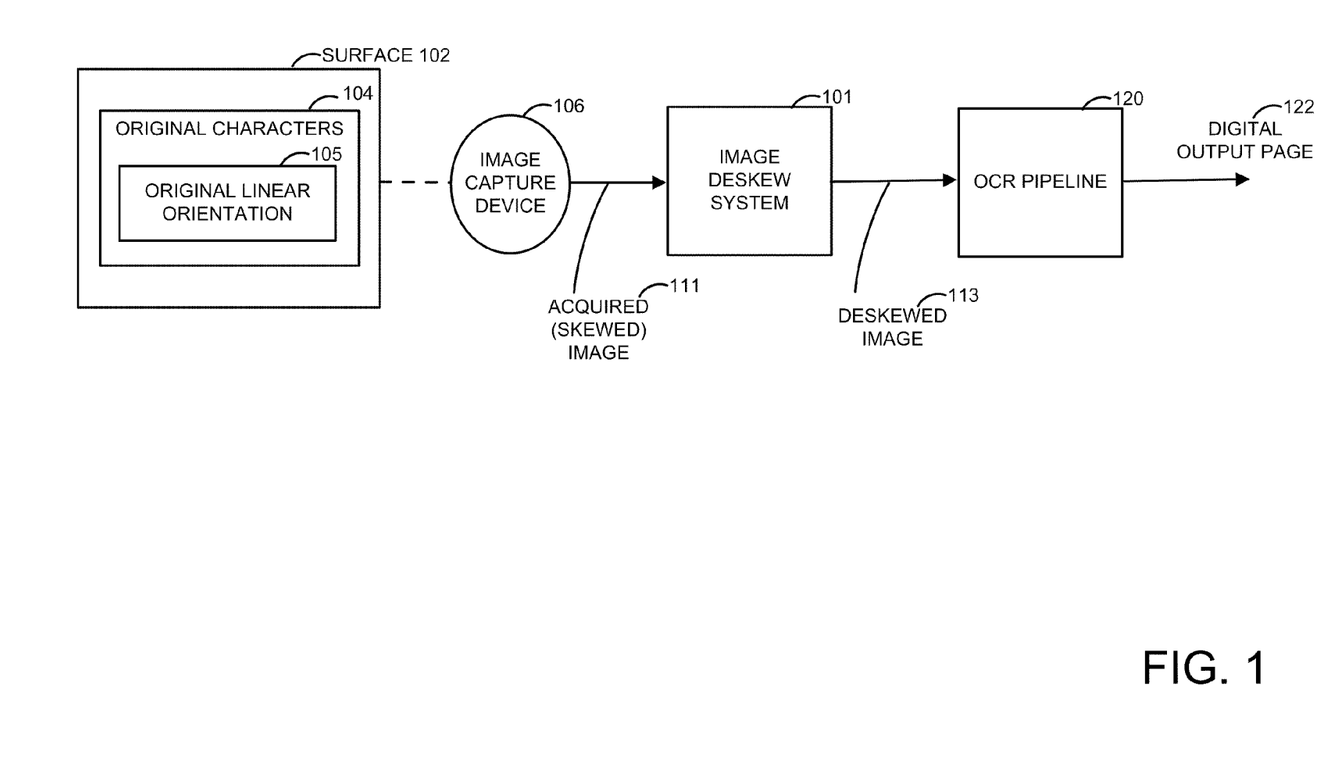
FIG. 1 is a block diagram illustrating an exemplary surface that displays an original set of characters, a skewed image of which is captured by an image capture device and processed by an image deskew system ("IDS") and an optical character recognition ("OCR") pipeline.

Turning now to the drawings, where like numerals designate like components, FIG. 1 is a simplified functional block diagram illustrating an exemplary surface 102 upon which is displayed an original set of characters 104 having an original linear orientation 105. For purposes of discussion and not limitation, it is assumed herein that the original set of characters includes one or more lines of text (in one or more regions or sub-regions of a page), and that the original linear orientation is horizontal. An image capture device 106, which may be any known or later developed device, such as a scanner or a digital camera, acquires (skewed) image 111. Image 111 is input to and processed by IDS 101 (discussed further below, in connection with FIG. 3) to produce deskewed image 113, which as shown undergoes further decoding at optical character recognition ("OCR") pipeline 122, to produce decoded digital output page 122. Aspects of IDS 101 may be co-located with image capture device 106 and/or OCR pipeline 120, or remotely located on one or more separate devices.

Figure 2:
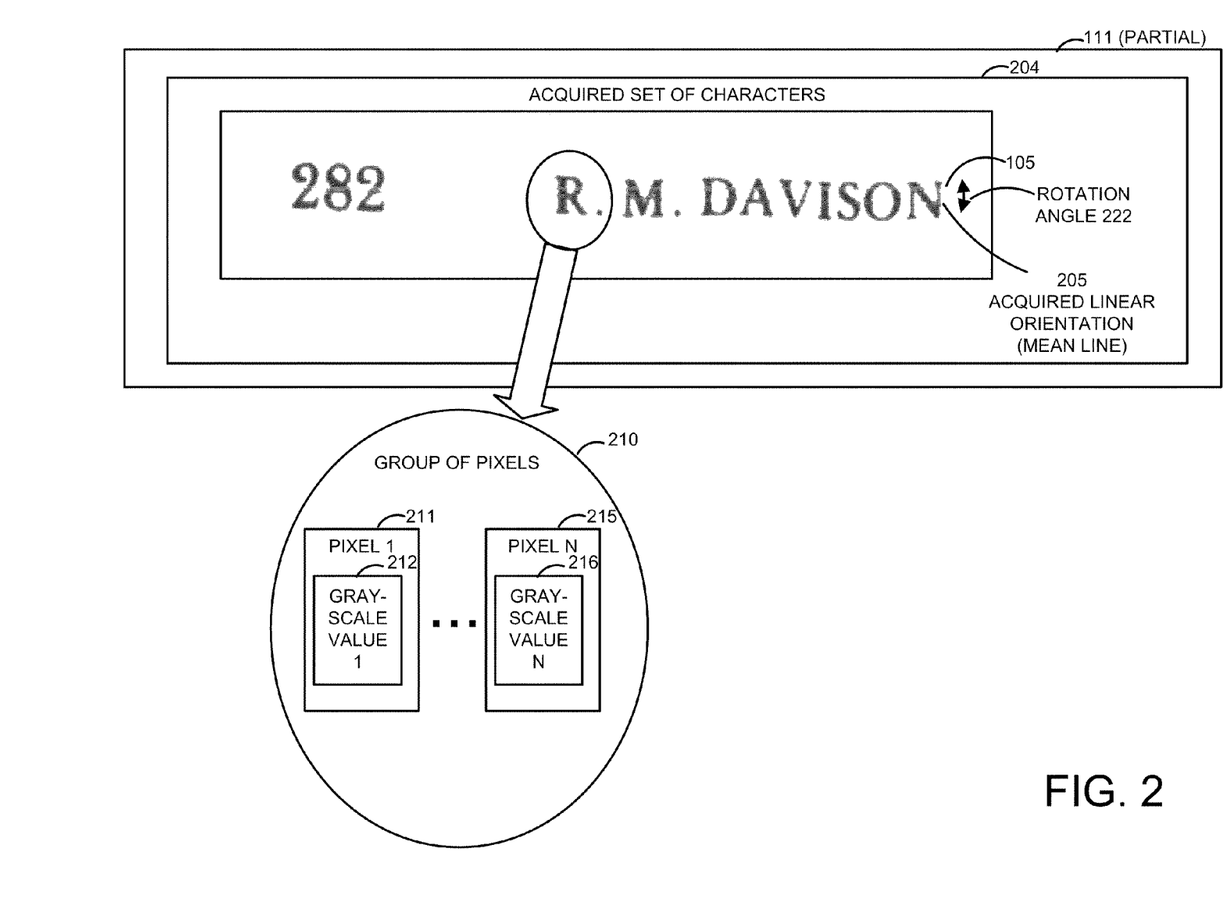
FIG. 2 illustrates an exemplary image acquired by the image capture device shown in FIG. 1, which image includes a single line of text.

With continuing reference to FIG. 1, FIG. 2 illustrates an exemplary portion of image 111—an acquired set of characters 204 (a single line of text is shown) corresponding to original set of characters 104 displayed in original linear orientation 105 (horizontally) on surface 102. It can be seen that each character of the acquired set of characters is represented by a group of pixels 210 in image 111. Generally, group of pixels 210 includes a number of pixels based on the resolution of image 111 and/or other characteristics of image capture device 106. Each pixel has a grayscale value. Pixels 1 through N are shown; pixel1 211 having grayscale value1 212 and pixelN 215 having grayscale value 216. It can be seen that acquired set of characters 204 has an acquired linear orientation 205 that is skewed relative to original linear orientation 105 in an amount expressed by a value of a rotation angle 222, which may be estimated using IDS 101 and/or techniques described herein. Accurately estimating the value of rotation angle 222 enables deskewing of image 111 prior to decoding of acquired set of characters 204 therein, which enhances accurate decoding, because decoding algorithms generally assume that lines of characters are horizontal. Character decoding may be accomplished via OCR pipeline 120, using any known or later developed image processing techniques (neither specific deskewing techniques nor the image processing techniques of OCR pipeline 120 are discussed further herein).

Figure 3:
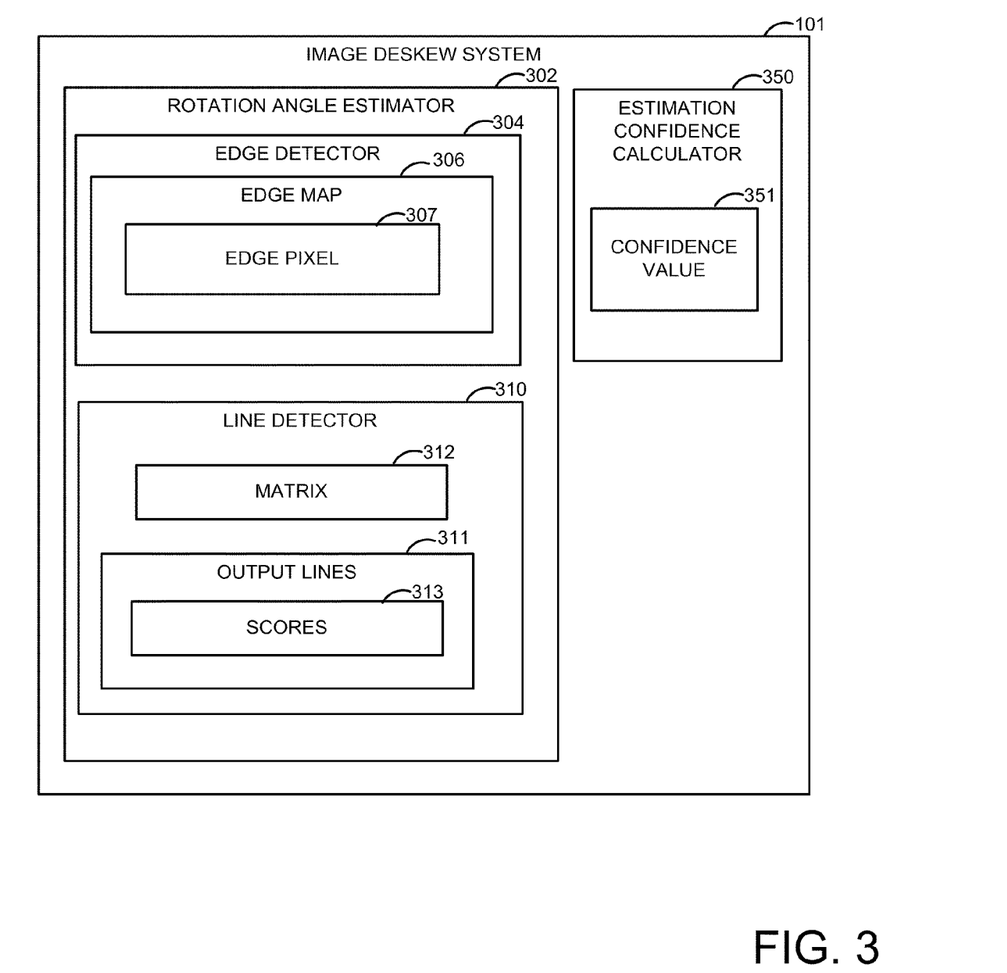
FIG. 3 is a simplified functional block diagram of the IDS shown in FIG. 1.

With continuing reference to FIGS. 1 and 2, FIG. 3 is a simplified functional block diagram of IDS 101 (shown in FIG. 1), which includes a rotation angle estimator 302 and an estimation confidence calculator 350. In general, design choices and/or operating environments dictate how and where specific functions of IDS 101 are implemented (for example, in a client-side or server-side operating environment). Such functions may be implemented using hardware, software, firmware, or combinations thereof.

Rotation angle estimator 302 is responsible for estimating an amount by which an acquired set of characters in an image is skewed relative to the original orientation of a corresponding original set of characters—that is, estimating the value of a rotation angle such as rotation angle 222 shown in FIG. 2. Rotation angle estimator 302 includes an edge detector 304 that produces an edge map 306 of edge pixels 307 and a line detector 310 that produces output lines 311 and their scores 313, along with a matrix 312. Further details regarding the implementation and operation of rotation angle estimator 302 are discussed further below, in connection with FIGS. 4-8.

Estimation confidence calculator 350 is responsible for providing confidence values 351, representing the confidence with which one or more rotation angles have been estimated. Based on the confidence value(s), an image may be deskewed (or not) to correct rotational deformation introduced by the image capture process prior to conducting further processing via OCR pipeline 120. Further details regarding the implementation and operation of estimation confidence calculator 350 are discussed further below, in connection with FIG. 4.

With continuing reference to FIGS. 1-3, FIG. 4 is a flow-chart illustrating an exemplary method for using aspects of IDS 101 to estimate a rotation angle (such as rotation angle 222) by which an image (such as image 111) captured by an image capture device (such as image capture device 106) is skewed, and to calculate a confidence in such estimation, which can be used to decide whether or not to deskew the image prior to further OCR processing/decoding. Generally, if a dominant slope of text lines within a particular image (page) can be identified, the dominant slope may be used to calculate the rotation angle.

The method illustrated in FIG. 4 may be implemented by computer-executable instructions (such as computer-executable instructions 806, shown and discussed in connection with FIG. 8) that are stored in a computer-readable storage medium (computer-readable storage media 804 are also shown and discussed in connection with FIG. 8) and executed by one or more general, multi-purpose, or single-purpose processors (such as processor 802, also shown and discussed in connection with FIG. 8). Unless specifically stated, the methods or steps thereof are not constrained to a particular order or sequence. In addition, some of the methods or steps thereof can occur or be performed concurrently.

The method begins at block 400 and continues at block 402, where an image, such as image 111, of an acquired set of characters, such as acquired set of characters 204, which corresponds to an original set of characters, such as original set of characters 104, is identified. The set of acquired characters is skewed relative to an orientation of the set of original characters in an amount able to be expressed by a value of a rotation angle, such as rotation angle 222. It is generally assumed that original set of characters 104 includes one or more lines of text, which are horizontally oriented (if lines of text are not present, then it may not be possible to determine whether image 111 is rotated—in such a case, an estimation of the rotation angle may be skipped, or the estimated rotation angle may be associated with a low confidence value). It is also assumed that within image 111, the location(s) of such line(s) of text within acquired set of characters is/are known or can be readily determined. In addition, lines of text may be present in one or more regions (not shown) of image 111. As such, one or more steps of the method described herein may be performed on a per-region basis. For discussion purposes, a single region, and often a single line of text, are discussed—where there are additional or different steps or calculations that may be desirable in connection with multiple regions and/or lines of text, such steps or calculations are explained in further detail below.

As discussed above, image 111 of original set of characters 204 is acquired by image capture device 106. Skew (and other deformities not discussed herein) may be introduced into captured image 111 in various ways. For example, a page in a scanner may not be aligned perfectly with respect to the scanning surface, or a handheld digital camera may be misaligned with respect to the surface upon which the original set of characters is displayed. Also as discussed above, each character of acquired set of characters 204 within image 111 is represented by a group of pixels 210 (shown in FIG. 2). Generally, group of pixels 210 includes a number of pixels based on the resolution of image 111 and/or other characteristics of image capture device 106. Each pixel has an address within the image, and one or more color/intensity values associated therewith, such as a grayscale value. It will be understood, however, that for purposes of discussion, the color/intensity value may be referred to as a binary reflectance value, for example, "black" or "white."

Figure 4:
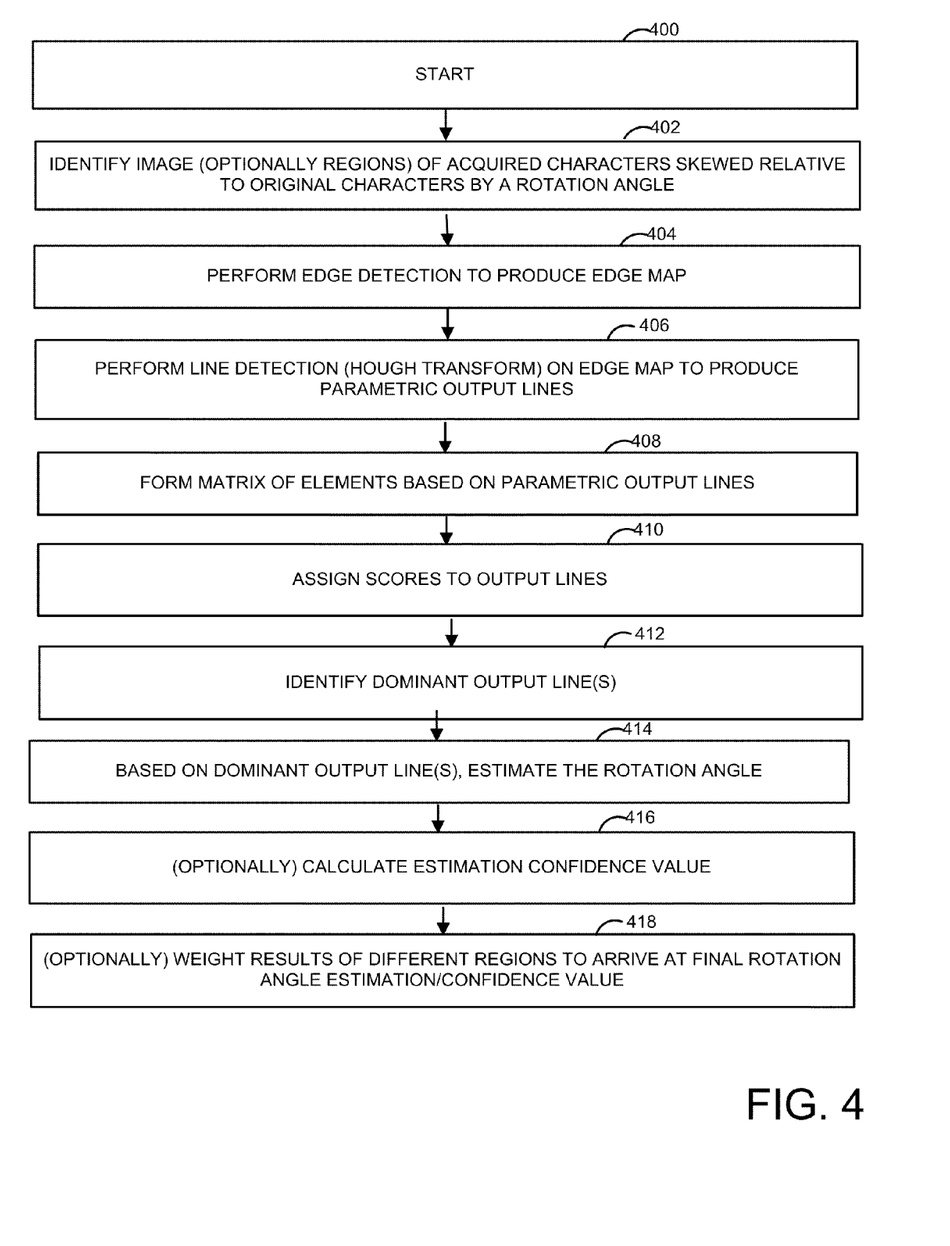
FIG. 4 is a flowchart of an exemplary method for using aspects of the IDS shown in FIGS. 1 and 3 to estimate a rotation angle by which an image captured by an image capture device is skewed, and to determine a confidence in such estimation.

With continuing reference to FIG. 4, next, at block 404, edge detection is performed on the image to produce an edge map, which identifies a set of edge pixels lying along a mean line and/or a base line (mean lines and base lines are discussed further below) of the characters within the acquired set of characters. In the context of IDS 101, edge detector 304 receives acquired set of characters 204 (or a portion thereof) and produces edge map 306, which includes edge pixels 307. It will be appreciated that there are many techniques for edge detection, which involves detecting sharp changes in image brightness to capture, among other things, lines in an image that appear as a small number of pixels of a different color on an otherwise unchanging background. In an exemplary implementation, edge detector 304 is implemented using a Sobel convolution filter.

Figure 5:
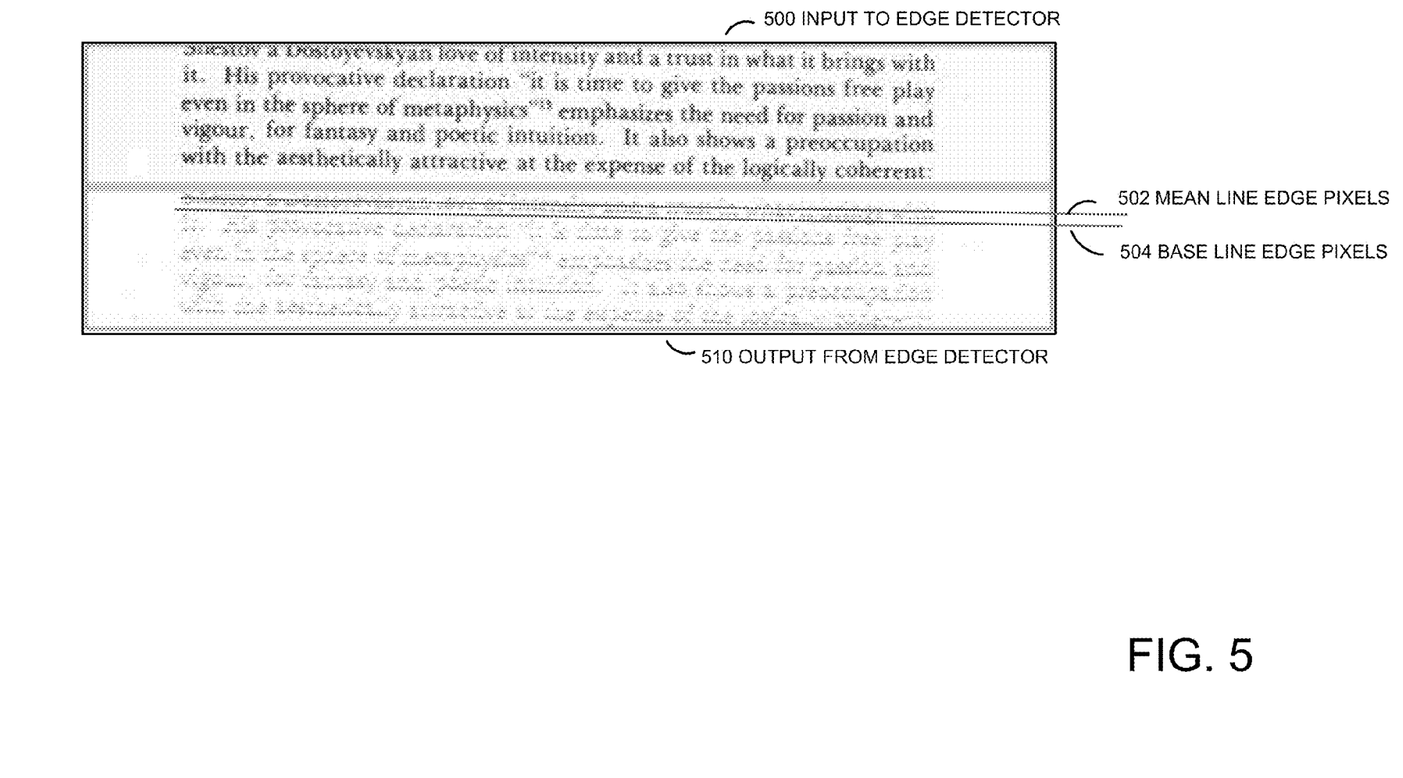
FIG. 5 illustrates exemplary inputs to and outputs from the edge detector shown in FIG. 3.

FIG. 5 illustrates input to (500) and output from (510) edge detector 304 in the context of an acquired set of characters that is composed of five (5) lines of text. In operation, edge detector 304 examines the groups of pixels representing the acquired characters to detect changes in the color (for example, grayscale value, binary reflectance value, or some other representation of color/intensity) of proximate pixels in a vertical direction. In one exemplary scenario, changes from "black" to "white," or from "white" to "black" are detected. In this manner, edge detector 304 identifies edge pixels 307, which are those pixels lying on either side of an imaginary baseline 504 on which the characters rest, and/or along an imaginary mean line 502 of the characters (a mean line represents the distance from the baseline to the top of regular lowercase characters of a line of text). There will be many changes in pixel color along the baselines and the mean lines of lines of text, and for each line of text it is possible to preserve edge pixels lying on either the baseline or the mean line or both, and to filter out pixels lying between the baseline and the mean line. Because output of a directional edge detection filter is a signed number, describing edge intensity and also direction, if only positive (or only negative) values from edge map 306 are retained, additional filtering is achieved by keeping only baseline edge pixels or only mean line edge pixels.

As can be seen from the exemplary output 510 from edge detector 306 depicted in FIG. 5, relevant details of text orientation are preserved. It is next desirable to detect straight lines that correspond to the baselines and/or mean lines of the lines of text. Then, the problem of skew detection will have been simplified to the more convenient problem of detecting the slope of such baselines and/or mean lines (that is, a dominant text line slope) within image 111, as the slope uniquely estimates the rotation angle of image 111.

Referring again to the flowchart of FIG. 4, at block 406, line detection is performed using the edge map to produce a set of output lines in parametric form. In the context of IDS 101, edge map 306 is input to line detector 310, to produce set of output lines 311. In an exemplary scenario, line detector 310 implements a linear Hough Transform filter. A Hough Transform is a feature extraction technique designed to find imperfect instances of objects within a certain class of shapes (in the instant case, to locate a set of straight lines within edge map 306) by a voting procedure. When edge map 306 is input to a Hough Transform algorithm, the set of output lines 311 likely includes all the baselines and/or mean lines of the acquired set of characters.

Figure 6:
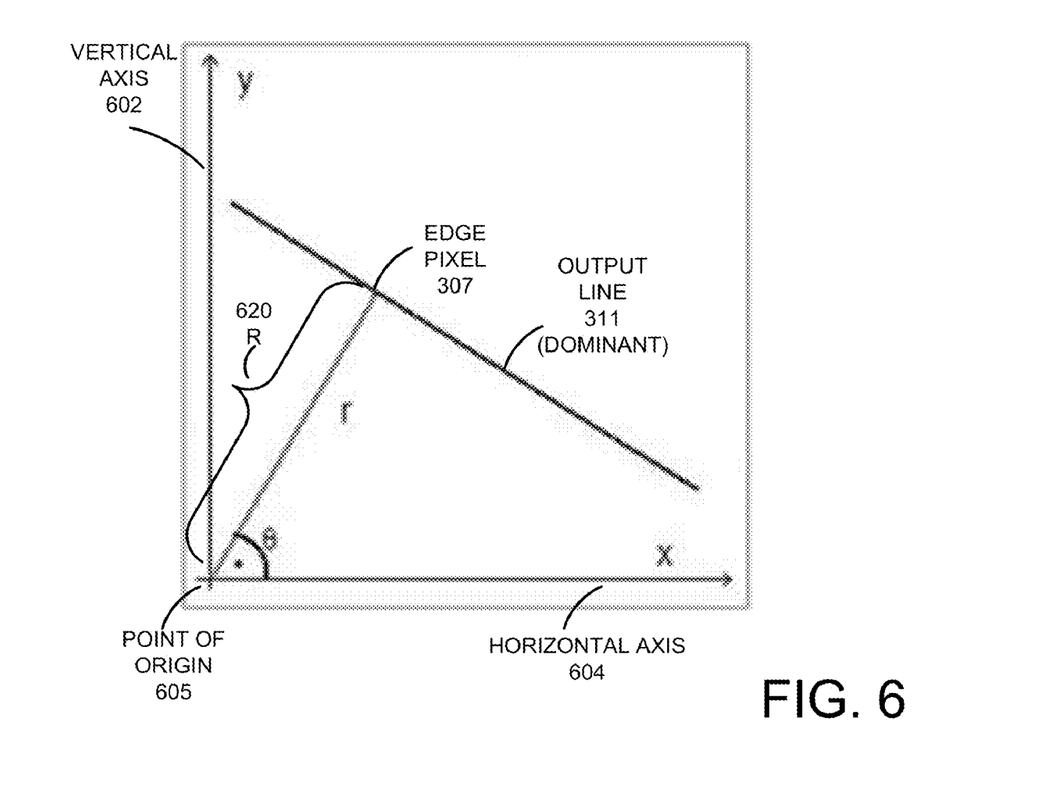
FIG. 6 is a graphical representation of the parameters of an exemplary output line generated by the line detector shown in FIG. 3.

FIG. 6 graphically illustrates the parameters (r 620, Θ 621) of an exemplary output line 311 generated by line detector/Hough Transform implementation 310. In image 111, a straight line can be represented as a point (r, Θ) in the parameter space. Lines around a particular edge pixel 307 are parameterized in this fashion, where r 620 represents the distance between output line 311 and a point of origin 605 as measured by the length of the normal line drawn perpendicular to output line 311 from the point of origin to a particular edge pixel 307 through which the output line passes, and Θ is an angle the normal line forms to a horizontal axis 604. For each edge pixel 307, a number of lines are plotted going through it, at different angles. Operation of line detector 310 and the Hough Transform are discussed further below, in connection with blocks 408-412.

Again referencing FIG. 4, as indicated at block 408, a matrix, such as matrix 312 having columns and rows represented by indices, is formed based on the output lines 111 generated by line detector 310. Matrix 312 may also be referred to as a "voting matrix." Generally, for each line plotted going through a particular edge pixel 307, another line perpendicular to it and which intersects the origin is plotted, and the length and angle of the other line is measured and recorded in matrix 312. One parameter from the (r, Θ) pair (in an exemplary implementation, Θ) maps to the matrix rows, while the other parameter (in an exemplary implementation, r) maps to the matrix columns. Thus, matrix elements found at a location corresponding to (r, Θ) represent the number of edge pixels 307 that overlap with a line defined by (r, Θ). An output line is represented by an element of a matrix, with each edge pixel contributing one "vote" to a particular output line. A score (scores are discussed further below, a score may be based on, for example the number of votes) is assigned to each output line It will be appreciated that the terms rows and columns may be used interchangeably and refer generally to matrix position identifiers. Thus, where it is indicated that a certain parameter maps to matrix columns, the parameter may also map to matrix rows, and vice-versa.

As indicated at block 410, scores, such as scores 313, are assigned to output lines 311, and at block 412, dominant output line(s) (and slope(s) thereof) are identified based on the scores. As discussed above, an output line is represented by an element of the matrix, with each edge pixel contributing one "vote" to a particular output line, and output line scores 313 (discussed further below) are generally determined based on a quantity of matrix elements at a particular (r, Θ) within matrix 312.

Figure 7:
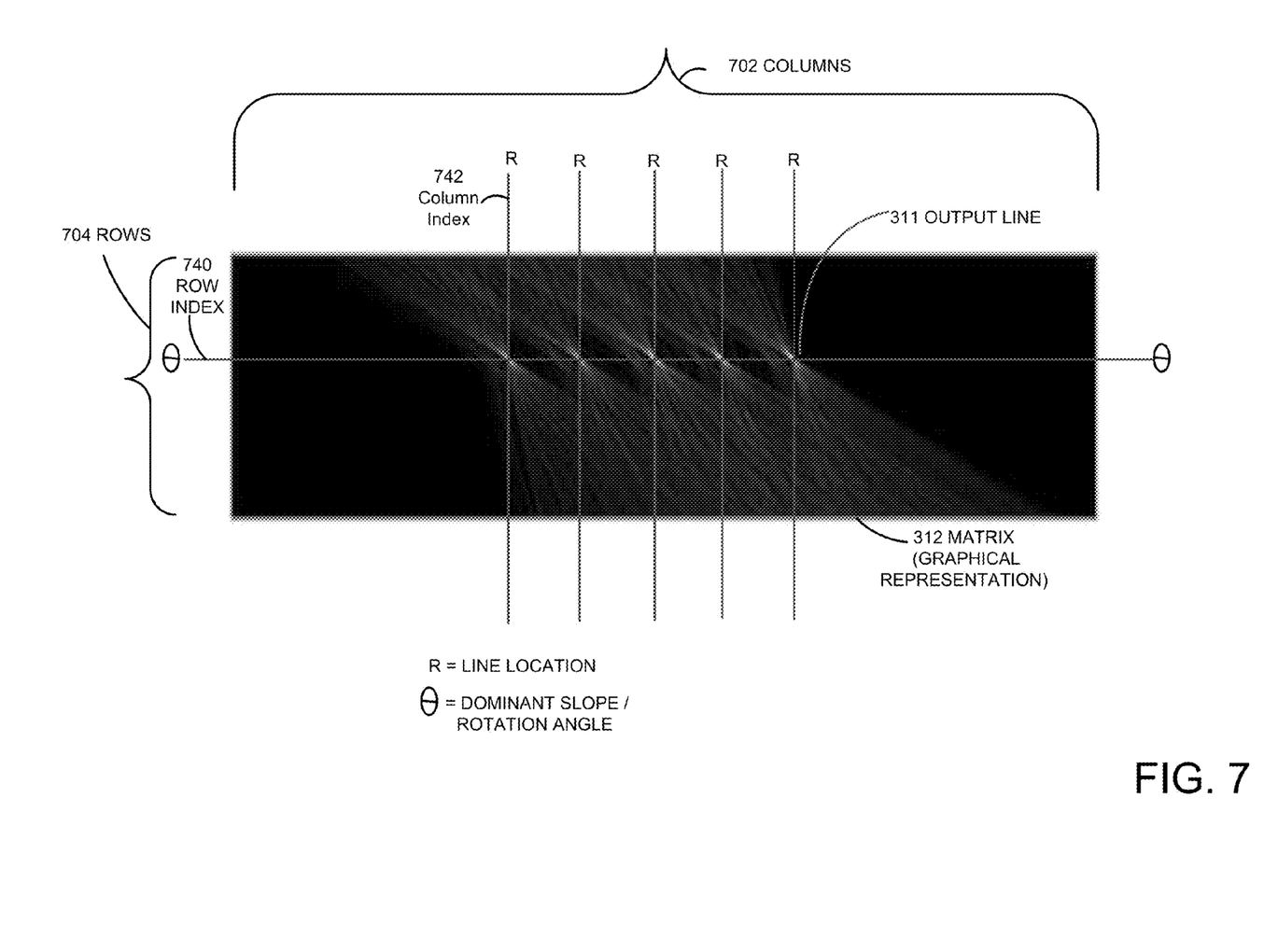
FIG. 7 is a graphical representation of an exemplary matrix, which facilitates identification of output line(s) having dominant slope(s) generated by the line detector shown in FIG. 3.

FIG. 7 is a graphical representation of the contents of an exemplary matrix 312 (the result of input 500 being fed to edge detector 304, and output 510 from edge detector 304 having been input to line detector 310) having rows Θ 704 and columns r 702, which facilitates identification of output line(s) 311 having dominant slope(s). Pixel luminance in the graphical representation is proportional to a value of a corresponding matrix element, which is in turn proportional to a number of edge pixels overlapping with an output line defined by (r, Θ). It can be seen that matrix 312 has five (5) dominant peaks, which is as expected as input 500 to the edge detector has five lines of text. Each peak corresponds to one baseline 504. Moreover, it can be seen that each peak is located in approximately the same row. This is also expected, as Θ maps to rows, and all of the acquired lines of text have the same slope.

Obtaining the index 740 of the row corresponding to the dominant text-line slope can be achieved in a number of ways, each of which involves identifying the row of the output line(s) with the maximum score value(s). In accordance with one possible implementation, a row having a maximum variance of elements may be identified. In accordance with another possible implementation, a sum of squared differences of consecutive elements in each row may be computed, and the row having the maximal sum may be identified. Once the winning row (and thus Θ) is identified, the number of text lines within the image can be approximated by counting the local maxima in that row, or using any other desired technique. As the number of text-lines located with the same slope Θ increases, it can be said with greater confidence that Θ accurately estimates the rotation angle of the image, and vice-versa.

In some cases, an image may have more than one distinct text line slope or some additional strong, non-text lines (for example, drawings, etc.). In those cases, it is desirable to compute a dispersion of scores of rows associated with the lines of different slopes. The lower the dispersion is, the higher the confidence of rotation angle estimation will be. One way of obtaining the dispersion is by dividing a sum of all row scores by the maximal row score.

Referring again to the flowchart of FIG. 4, as indicated at block 416, a confidence value, such as confidence value 351, which is a measure of the reliability of an estimated rotation angle, may be calculated. In the context of IDS 101, estimation confidence calculator 350 is responsible for providing confidence values 351. One way of obtaining the confidence value associated with a rotation angle estimation for a given image is by multiplying the number of lines of text found in the image by an inverse dispersion of row scores. Other factors may also be taken into account, such as the total number of matrix elements associated with a dominant output line/Θ normalized to a particular image area, and/or the number of image pixels covered by the highest-scoring output line normalized to the image width, and the like.

If, as indicated at block 418, rotation angles are being estimated in multiple regions or sub-regions of image 111, the rotation angle estimation results and associated confidence values may be obtained on a per-region basis. The confidence values may be used as weighting factors to arrive at a final rotation angle estimation and/or final confidence value for the image. In accordance with one exemplary weighting scenario, the final rotation angle estimation may be arrived at by multiplying a sum of the confidence values of each region by the estimated rotation angle for a particular region, and dividing the resulting product by the sum of the confidence values of each region.

Once the rotation angle has been estimated and there is a desired amount of confidence in the estimation (for example, the confidence value is over a predetermined threshold), then the image may be deskewed (rotated back by the estimated rotation angle), to correct the skew deformation. There are multiple ways of rotating an image, with or without image filtering, which are not discussed in detail herein. One way of rotating is to transform coordinates of each pixel using a rotation matrix; another way is to approximate rotation by one horizontal and one vertical shear.

If there is less than a desired amount of confidence in the rotation angle estimation (for example, the confidence value is under a predetermined threshold), then it may be decided not to deskew the image.

With continuing reference to FIGS. 1-7, FIG. 8 is a simplified functional block diagram of an exemplary operating environment 800, with which aspects of IDS 101 may be implemented or used. Operating environment 800 is indicative of a wide variety of general-purpose, special-purpose, client- or server-based, stand-alone or networked computing environments. Operating environment 800 may be, for example, a type of computer, such as a workstation, a server, a client-side electronic device, or any other type of stand-alone or networked computing device or component thereof now known or later developed. Operating environment 800 may also be a distributed computing network or Internet-based service, for example.

Figure 8:
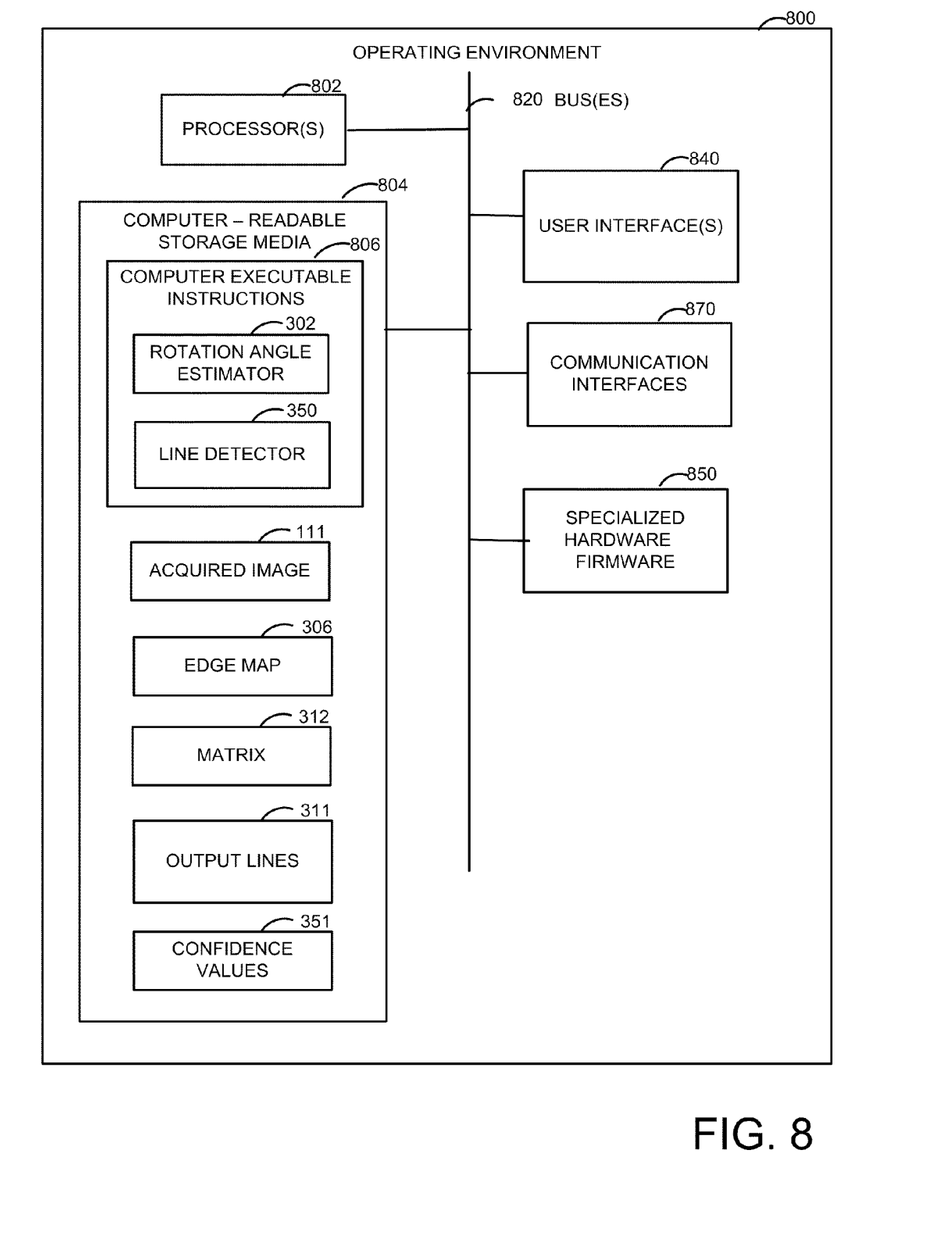
FIG. 8 is a simplified functional block diagram of an exemplary configuration of an operating environment in which all or part of the IDS shown in FIGS. 1 and 3, or the method(s) shown in FIG. 4, may be implemented or used.

One or more components shown in FIG. 8 may be packaged together or separately to implement functions of operating environment 800 (in whole or in part) in a variety of ways. As shown, bus(es) 820 carries data, addresses, control signals and other information within, to, or from computing environment 800 or components thereof.

Communication interface(s) 870 are one or more physical or logical elements that enhance the ability of operating environment 800 to receive information from, or transmit information to, another operating environment (not shown) via a communication medium. Examples of communication media include but are not limited to: wireless or wired signals; computer-readable storage media; computer-executable instructions; communication hardware or firmware; and communication protocols or techniques.

Specialized hardware/firmware 850 represents any hardware or firmware that implements functions of operating environment 800. Examples of specialized hardware/firmware 850 include encoder/decoders ("CODECs"), decrypters, application-specific integrated circuits, secure clocks, and the like.

A processor 802, which may be one or more real or virtual processors, controls functions of operating environment 800 by executing computer-executable instructions 806 (discussed further below).

Computer-readable storage media 804 represent any number and combination of non-transient, local or remote components, in any form, now known or later developed, capable of recording or storing computer-readable data, such as instructions 806 (discussed further below) executable by processor 802 and including but not limited to image(s) 111, edge map(s) 306, matrix(icies) 312, output lines 311, and confidence values 351. In particular, non-transient computer-readable storage media 804 may be, or may include persistent memory or main memory, and may be in the form of: a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof.

Computer-executable instructions 806 represent any signal processing methods or stored instructions that electronically control predetermined operations on data. In general, computer-executable instructions 806 are implemented as software programs according to well-known practices for component-based software development, and encoded in computer-readable media (such as one or more types of computer-readable storage media 804). Software programs may be combined or distributed in various ways. Among other things, functional aspects of rotation angle estimator 302 and line detector 350 are implemented using computer-executable instructions.

User interface(s) 840 represent a combination of presentation tools and controls that define the way a user, such as a user of a client-side electronic device, interacts with operating environment 800. One type of user interface is a graphical user interface ("GUI"), although any known or later developed type of user interface is possible. Presentation tools are used to receive input from, or provide output to, a user. An example of a physical presentation tool is a display such as a monitor device. An example of a logical presentation tool is a data organization technique (for example, a window, a menu, or a layout thereof). Controls facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function as an interface for both inputs to, and outputs from, a user.

Various aspects of an operating environment and an architecture/techniques that are used to implement aspects of IDS 101 have been described. It will be understood, however, that all of the described elements need not be used, nor must the elements, when used, be present concurrently. Elements described as being computer programs are not limited to implementation by any specific embodiments of computer programs, and rather are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable storage medium, not comprising a propagated data signal, encoded with computer-executable instructions which, when executed by a processor, perform a method for recognizing characters of an original set of characters displayed on a surface in an original linear orientation, the method comprising:
   within an image of the original set of characters, identifying an acquired set of characters represented by pixels of the image, the acquired set of characters having an acquired linear orientation skewed relative to the original linear orientation by a rotation angle;
   applying an edge detection filter to the acquired set of characters to produce an edge map, the edge map identifying edge pixels comprising pixels of the image lying along a plurality of lines associated with the acquired set of characters;
   inputting the edge map to a linear hough transform filter to produce a set of output lines in (r, $\Theta$) parametric form, where for each output line, r is a length of a normal line drawn perpendicular to the output line between a point of origin and a particular edge pixel through which the output line passes, and $\Theta$ is an angle the normal line forms to a horizontal axis;
   forming a matrix having rows and columns, each of the edge pixels passed through by a particular output line (r, $\Theta$) being represented by an element of the matrix located at a particular row corresponding to $\Theta$ of the particular output line and a particular column corresponding to r of the particular output line;
   assigning a score to each output line, the score based on a dispersion of edge pixels within the particular row corresponding to $\Theta$ of the particular output line;
   based on the scores, within the set of output lines, identifying at least two dominant output lines, (rdom1, $\Theta$dom1) and (rdom2, $\Theta$dom2);
   calculating a first confidence value corresponding to a likelihood that $\Theta$dom1 estimates the rotation angle;
   calculating a second confidence value corresponding to a likelihood that $\Theta$dom2 estimates the rotation angle; and
   based on the first and second confidence values, determining whether $\Theta$dom1 or $\Theta$dom2 estimates the rotation angle.

2. The computer-readable storage medium according to claim 1,
   wherein calculating the first confidence value comprises determining a first dispersion of scores by dividing a sum of all scores by the score of the particular row corresponding to $\Theta$dom1,
   wherein calculating the second confidence value comprises determining a second dispersion of scores by dividing the sum of all scores by the score of the particular row corresponding to $\Theta$dom2,
   wherein when the first dispersion of scores is lower than the second dispersion of scores, deeming it likely that $\Theta$dom1 estimates the rotation angle, and
   wherein when the second dispersion of scores is lower than the first dispersion of scores, deeming it likely that $\Theta$dom2 estimates the rotation angle.

3. The computer-readable storage medium according to claim 1, further comprising:
   after determining whether $\Theta$dom1 or $\Theta$dom2 estimates the rotation angle, based on either the first confidence value or the second confidence value or both, determining whether to deskew the acquired set of characters by rotating the image back by the estimated rotation angle,
   when either the first confidence value or the second confidence value or both are over a predetermined threshold, deskewing the acquired set of characters, and when either the first confidence value or the second confidence value or both are under the predetermined threshold, not deskewing the acquired set of characters.

4. A computer-readable storage medium, not comprising a propagated data signal, encoded with computer-executable instructions which, when executed by a processor, perform a method for recognizing characters of an original set of characters displayed on a surface in an original linear orientation, the method comprising:
   identifying an image, acquired by an image capture device, of the original set of characters, the image having an acquired set of characters corresponding to the original set of characters, each character of the acquired set of characters represented by a group of pixels in the image, each pixel of the group having a grayscale value, the acquired set of characters having an acquired linear orientation skewed relative to the original linear orientation in an amount able to be expressed by a rotation angle;
   within the image, identifying a portion of the acquired set of characters;
   applying an edge detection filter to the portion of the acquired set of characters to produce an edge map, the edge map identifying, based on the grayscale values of pixels from groups of pixels representing characters within the portion, a set of edge pixels comprising pixels lying along a mean line or a base line of the characters within the portion;
   inputting the edge map to a linear hough transform filter, the linear hough transform filter configured to produce a set of output lines in (r, $\Theta$) parametric form, where for each output line, r is a length of a normal line drawn perpendicular to the output line between a point of origin and a particular edge pixel through which the output line passes, and $\Theta$ is an angle the normal line forms to a horizontal axis;
   forming a matrix having a plurality of rows identified by row indices and a plurality of columns identified by column indices, each of the edge pixels passed through by a particular output line (r, $\Theta$) being represented by an element of the matrix located at a particular row index corresponding to Θ of the particular output line and a particular column index corresponding to r of the particular output line;

based on a distribution of the elements within the matrix, assigning a score to at least some of the output lines;

based on the scores of the at least some of the output lines, identifying a dominant output line;

identifying the row index of the matrix associated with the dominant output line;

based on the identified row index, identifying the angle Θ of the dominant output line; and estimating the rotation angle based on the identified angle Θ, the original set of characters able to be decoded based at least in part on the estimated rotation angle.

5. The computer-readable storage medium according to claim 4, further comprising:

deskewing the acquired set of characters in an amount based on the estimated rotation angle in such a manner that the characters of the original set of characters are able to be recognized.

6. The computer-readable storage medium according to claim 4, further comprising:

calculating a confidence value, the confidence value a representation of a reliability of the estimated rotation angle, and based on the confidence value, deciding whether to deskew the acquired set of characters.

7. The computer-readable storage medium according to claim 6, wherein assigning a score to at least some of the output lines comprises assigning a score to at least some of the output lines based on a quantity of elements located on each of the at least some of the output lines, the dominant output line having the most elements located thereon.

8. The computer-readable storage medium according to claim 7, wherein calculating the confidence value comprises either normalizing the quantity of elements located on the dominant output line over an area of the image, or normalizing a number of edge pixels covered by the dominant output line over a width of the image, and calculating the confidence value based on the normalizing.

9. The computer-readable storage medium according to claim 6, wherein the original set of characters and the acquired set of characters comprise a number of lines of text, the number of lines of text corresponding to multiple dominant output lines sharing the same row index, wherein the number of lines of text is approximated by counting local element maximas in the same row index, and wherein locations of the number of lines of text are determined by identifying, for each of the number of lines of text in the same row index, a column index and the corresponding normal line r.

10. The computer-readable storage medium according to claim 9, wherein deciding whether to deskew the acquired set of characters comprises calculating the confidence value based on multiplying the number of lines of text by an inverse dispersion of the scores of the at least some of the output lines; and deciding whether to deskew based on both the estimated rotation angle and the confidence value.

11. The computer-readable storage medium according to claim 4, wherein assigning a score to at least some of the output lines comprises assigning a score to at least some of the output lines based on a quantity of elements located on each of the at least some of the output lines, the dominant output line having the most elements located thereon.

12. The computer-readable storage medium according to claim 4, wherein assigning a score to at least some of the output lines comprises for at least some consecutive elements located in consecutive columns at the at least some of the row indices, computing a sum of squared differences of grayscale values of edge pixels associated with the consecutive elements located in consecutive columns, the score of a particular output line proportional to the computed sum, the dominant output line having the maximum score.

13. The computer-readable storage medium according to claim 4, wherein assigning a score to at least some of the output lines comprises for consecutive elements located in consecutive columns at the at least some of the row indices, computing a sum of squared differences of the number of consecutive elements located in consecutive columns, the score of a particular output line proportional to the computed sum, the dominant output line having the maximum score.

14. The computer-readable storage medium according to claim 4, wherein the image comprises a page having a plurality of regions, an acquired set of characters located in each region, the portion of the acquired set of characters being identified within each region, and wherein the steps of applying the edge detection filter to the portion of the acquired set of characters, inputting the edge map to the linear hough transform filter, forming the matrix, assigning the score, identifying the dominant output line, identifying the row index, identifying the angle Θ of the dominant output line, and estimating the rotation angle are performed based on the portion of the acquired set of characters located in each region.

15. The computer-readable storage medium according to claim 14, wherein the plurality of regions comprise rectangular regions, evenly sampled across the height of the page.

16. The computer-readable storage medium according to claim 14, further comprising:

deskewing the acquired set of characters in an amount based on the estimated rotation angles associated with each region.

17. The computer-readable storage medium according to claim 16, wherein deskewing comprises calculating confidence values representing the reliability of the estimated rotation angles associated with different regions;

using the calculated confidence values as weighting factors to estimate a page rotation angle; and deskewing the page in an amount based on the estimated page rotation angle.

18. The computer-readable storage medium according to claim 4, wherein the edge detection filter comprises a Sobel convolution kernel filter.

19. A system for recognizing characters of an original set of characters displayed on a surface in an original linear orientation, the system comprising:

a computer-readable storage medium, not comprising a propagated data signal; and a processor responsive to the computer-readable storage medium and to one or more computer programs stored in the computer-readable storage medium, the one or more computer programs, when loaded into the processor and executed, operable to perform a method comprising;

identifying an image, acquired by an image capture device, of the original set of characters, the image having an acquired set of characters corresponding to the original set of characters, each character of the acquired set of characters represented by a group of pixels in the image, each pixel of the group having a grayscale value, the acquired set of characters having an acquired linear orientation skewed relative to the original linear orientation in an amount able to be expressed by a rotation angle, within the image, identifying a portion of the acquired set of characters;

applying an edge detection filter to the portion of the acquired set of characters to produce an edge map, the edge map identifying, based on the grayscale values of pixels from groups of pixels representing characters within the portion, a set of edge pixels comprising pixels lying along a mean line or a base line of the characters within the portion, inputting the edge map to a linear hough transform filter, the linear hough transform filter configured to produce a set of output lines in (r, Θ) parametric form, where for each output line, r is a length of a normal line drawn perpendicular to the output line between a point of origin and a particular edge pixel through which the output line passes, and Θ is an angle the normal line forms to a horizontal axis, forming a matrix having a plurality of rows identified by row indices and a plurality of columns identified by column indices, each of the edge pixels passed through by a particular output line (r, Θ) being represented by an element of the matrix located at a particular row index corresponding to Θ of the particular output line and a particular column index corresponding to r of the particular output line, based on a distribution of the elements within the matrix, assigning a score to at least some of the output lines, based on the assigned scores, identifying a dominant output line;

identifying the row index of the matrix associated with the dominant output line, based on the identified row index, identifying the angle Θ of the dominant output line, and estimating the rotation angle based on the identified angle Θ, the original set of characters able to be decoded based at least in part on the estimated rotation angle.

20. The system according to claim 19, wherein the processor is associated with an operating environment selected from the group comprising: a network-side operating environment and a client-side operating environment.

* * * * *